United States Patent [19]
Fukata

[11] 3,750,033
[45] July 31, 1973

[54] SYSTEM FOR RECEIVING ONE OF PARTICULAR CONTROL SIGNALS PRECEDED BY A COMMON START SIGNAL UNDER PROTECTION AGAINST STATIC NOISE

[76] Inventor: Masao Fukata, 2-10-14, Shimorenjaku, Mitaka-shi, Tokyo-to, Japan

[22] Filed: Aug. 10, 1971

[21] Appl. No.: 170,522

[30] Foreign Application Priority Data
Aug. 10, 1970 Japan .............................. 45/69289

[52] U.S. Cl. ................. 325/478, 325/322, 325/323, 325/324, 325/377, 325/466, 325/473, 325/474, 325/477, 325/478, 425/480, 328/167
[51] Int. Cl. ............................................ H04b 1/10
[58] Field of Search .....................325/322–324, 377, 472–480, 64, 325, 466; 328/165–167

[56] References Cited

UNITED STATES PATENTS

| | | | |
|---|---|---|---|
| 3,126,449 | 3/1964 | Shirman | 325/474 |
| 2,632,101 | 3/1953 | Quarles | 325/474 |
| 3,375,445 | 3/1968 | Salmet | 325/478 |
| 3,555,438 | 1/1971 | Ragsdale | 325/323 |

*Primary Examiner*—Albert J. Mayer
*Attorney*—Robert M. Dunning

[57] ABSTRACT

A system for receiving a control signal formed in sequence by a common start signal and one of particular control signals by the use of a first decision circuit for detecting the common start signal and a second decision circuit operational after the first decision circuit receives the common start signal, in which a third decision circuit responsive to a statice noise component included in the control signal is provided in parallel with the second decision circuit so that the particular detection of the control signal can be performed in disregard of static noise in a fail-safe manner.

5 Claims, 12 Drawing Figures

INVENTOR.
Masao Fukata
BY
Robert M. Dunning

INVENTOR.
Masao Fukata
BY
Robert M. Dunning

INVENTOR.
*Masao Fukata*
BY

SYSTEM FOR RECEIVING ONE OF PARTICULAR CONTROL SIGNALS PRECEDED BY A COMMON START SIGNAL UNDER PROTECTION AGAINST STATIC NOISE

This invention relates to a system for receiving one of particular control signals preceded by a common start signal.

In a broadcast system for control signals, such as an emergency broadcast system, a control signal or control signals must be transmitted to all or a part of receivers included in a service area. In this case, the control signals for different service zones are formed by a common start signal and a plurality of particular control signals assigned to respective ones of the different service zones and sent out after the common start signal. Accordingly, the common start signal openes a first gate of a detector for control signals of each receiver in the whole service area, and the particular control signal opens a second gate connected to the opened first gate so as to unmute the receiver established to an muted condition. In this broadcast system, only the common start signal is transmitted under protection against spurious triggering, since the particular control signals are substantially protected from spurious triggering due to ordinary close of the first gate and since broadcast program signals frequently causing spurious triggering are usually stopped at a time within which the perticular control signal is transmitted. However, since control signals such as emergency information are usually transmitted at stormy weather, normal transmission of the control signals is affected by static noise.

An object of this invention is to provide a system for receiving one of particular control signals preceded by a common start signal under protection against noise.

The principle of this invention is as follows:

1. Since the common start signal may have a relatively long duration, the continuous duration of a continuous start signal or the number of repetition cycles of a keyed start signal can be increased to avoid omission of the common start signal. However, particular control signals have not so long allowable duration.

2. Omission of signals in response to static noise is caused by desensitization of a receiver due to rapid increase of the automatic-gain-control voltage of amplifying stages of the receiver. Since the time constant of the automatic gain control circuit is established so as to be affected by instantaneous fluctuations of a received input wave, the desensitization is extremely small if the duration of static noise is short (e.g.; less than several tens milli-seconds). However, if the duration of static noise is more than several hundreds milli-seconds, the desensitization is caused since the automatic gain control circuit responds to deviation of the average voltage of the envelope of the received input wave. Accordingly, particular control signals may be affected by static noise.

3. In accordance with a feature of this invention, the second gate (i.e., a control switch) is opened by the use of sudden fluctuation of a voltage obtained by rectifying a static noise component in an output of a detector in response to strong static noise. This opening of the second gate is performed without no relation with correct or incorrect detection of the particular control signal, but is limited to a time from the termination of the common control signal to the termination of control information (e.g.; emergency information) or the normal duration of the particular control signal. The above operation is performed by providing an atmopherics elimination circuit performing the above operation. In the actual case, the second gate is a control switch for example connected to a control object.

4. Accordingly, the system of this invention has a function of fail-safe. For example, it is assumed that emergency information must be transmitted to a south zone only which is one of four zones (i.e.; an east zone, an west zone, the south zone and a north). If the second gate of a receiver belonging to the south zone is not opened by the particular control signal for the south zone due to desensitization of the receiver in response to static noise while the first gate of the receiver is opened in response to the common start signal, the second gate can be opened by the static responsive circuit mentioned above. On the other hand, since the first gate of each receiver belonging to the east zone is also opened, the second gate of the receiver of the east zone is also opened by the atmospherics elimination circuit if strong static is caused at the east zone. This is an erroneous triggering operation. However, since desired transmission of the control information to the south zone can be performed without spurious triggering, the above erroneous triggering operation can be affirmed as fail-safe function.

The principle, constructions and operations of the system of this invention will be better understood from the following more detailed discussion taken in conjunction with the accompanying drawings, in which the same or equivalent parts are designated by the same reference numerals, characters, and symbols, and in which.

Figures 1A, 1B, 1C:
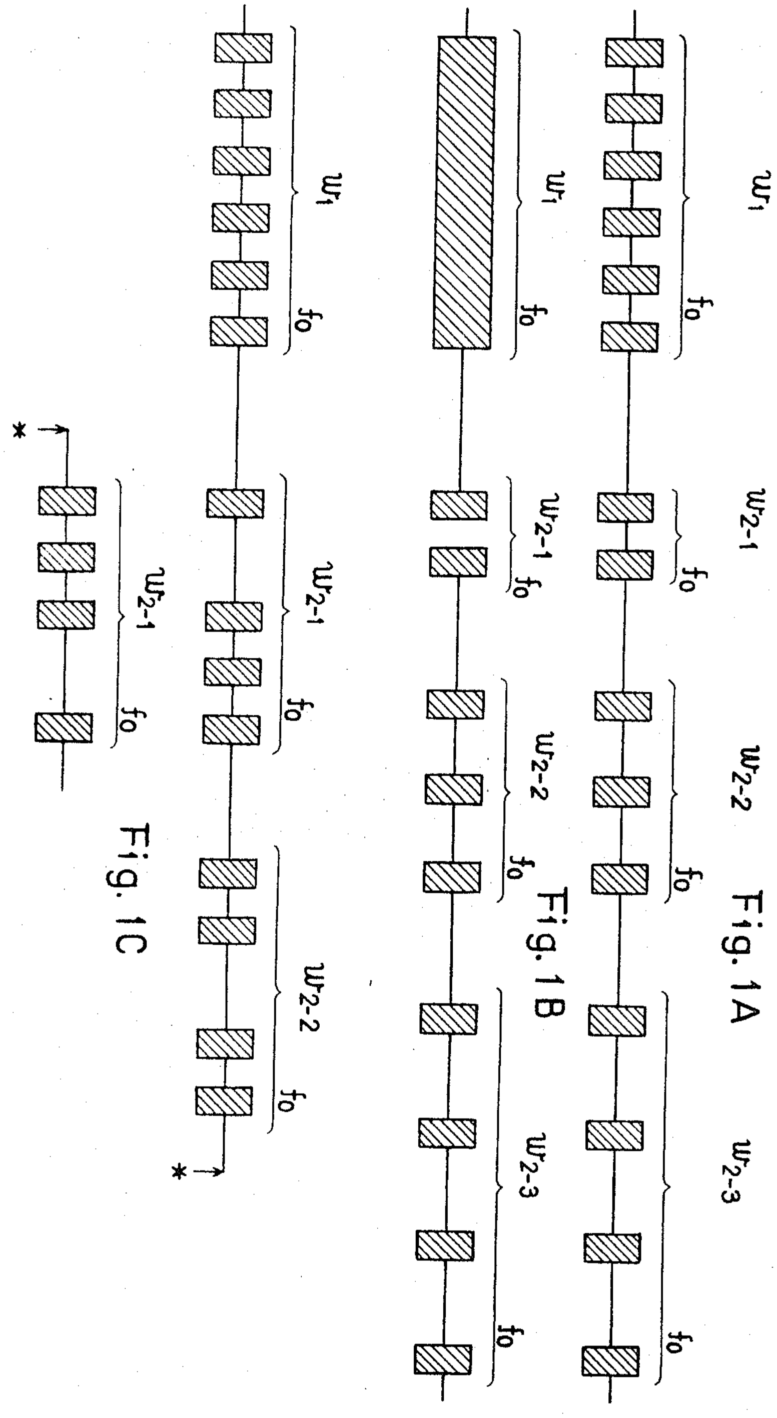
FIGS. 1A, 1B, 1C, 3A, 3B and 3C are time charts explanatory of formats of control signals to be received by the system of this invention.

With reference to FIG. 1A, a control signal to be received in accordance with this invention is a sequence signal formed by a common start signal $w_1$ of keyed wave having a frequency $f_0$ and a particular control signal $w_{2\text{-}2}$, $w_{2\text{-}2}$ or $w_{2\text{-}3}$ of keyed wave having a frequency $f_0$. The particular control signals $w_{2\text{-}1}$, $w_{2\text{-}2}$ and $w_{2\text{-}3}$ have different numbers of marks and different durations of spaces for differentiating from one another. A common control signal $w_1$ may be a continuous signal as shown in FIG. 1B. Moreover, the particular control signals $w_{2\text{-}1}$, $w_{2\text{-}2}$ and $w_{2\text{-}3}$ may be respectively coded signals as shown in FIG. 1C.

Figure 2:
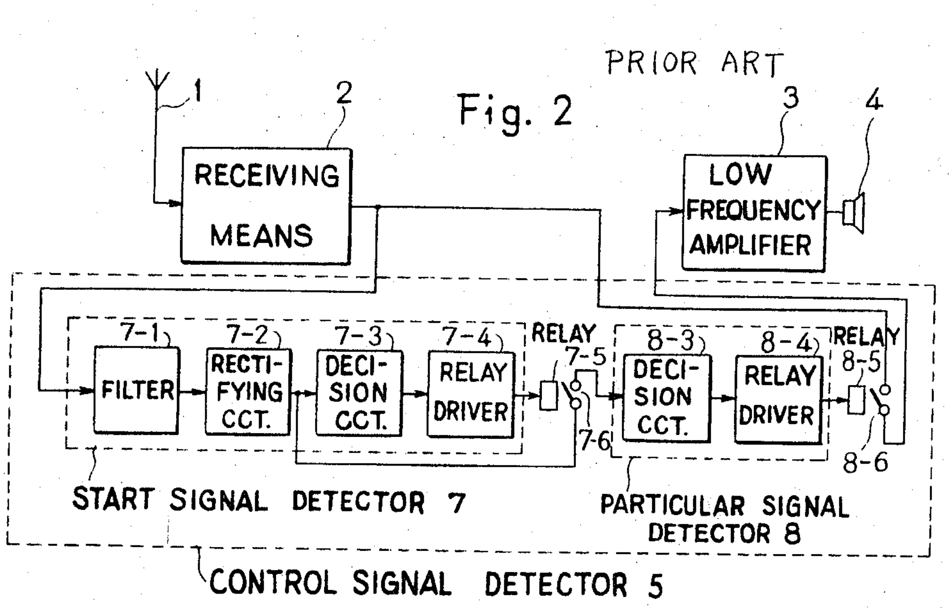
FIGS. 2 and 4 are block diagrams each illustrating an example of a conventional system for receiving a control signal.

With reference to FIG. 2, a conventional system for receiving a control signal described with reference to FIGS. 1A, 1B and 1C comprises an antenna 1, a receiving means 2 including amplifying stage and a demodulation stages, a low-frequency amplifier 3, a speaker 4, and a control signal detector 5 for detecting a control signal to close a contact 8-6 so as to unmute the speaker 4. If a control signal is transmitted from a sending side (not shown) as a modulated wave, this modulated wave is received the antenna 1 and the receiving by the 2 so as to demodulate the control signal. The control signal detector 5 comprises a start signal detector 7 and a particular signal detector 8. The start signal detector 7 comprises a filter 7-1 for selecting the signal of frequency $f_o$, a rectifying circuit 7-2, a decision circuit 7-3 for detecting a correct start signal, a relay driver 7-4, and a relay 7-5 having a contact 7-6. The particular signal detector 8 comprises a decision circuit 8-3 for detecting a correct particular signal, a relay driver 8-4 and a relay 8-5 having a contact 8-6. If the start signal in the control signal demodulated by the receiving means 2 is decided as "correct" in the decision circuit 7-3 comprising a time constant circuit, the contact 7-6 is closed so that the output of the rectifying circuit 7-2 is applied to the decision circuit 8-3. Accordingly, if a particular signal transmitted after the start signal satisfies conditions predetermined in the decision circuit 8-3, the contact 8-6 is closed so as to connect the receiving means 2 to the low frequency amplifier 3.

Figure 3A:
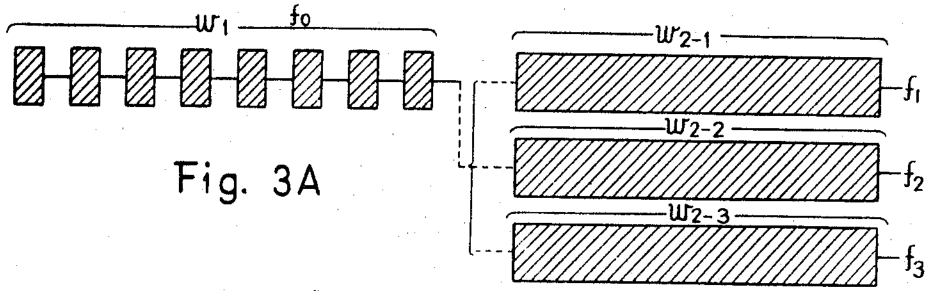
Figure 3B:
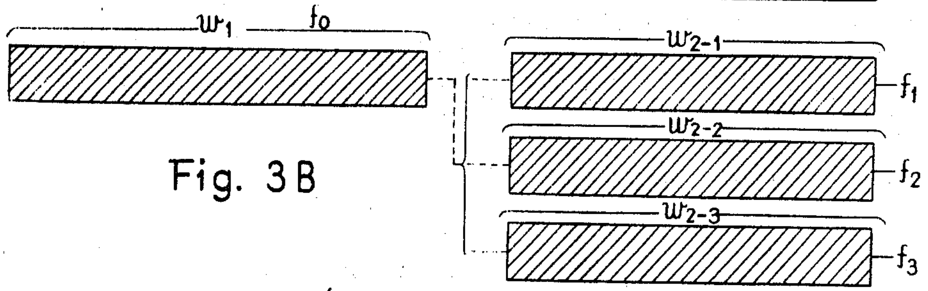
Figure 3C:
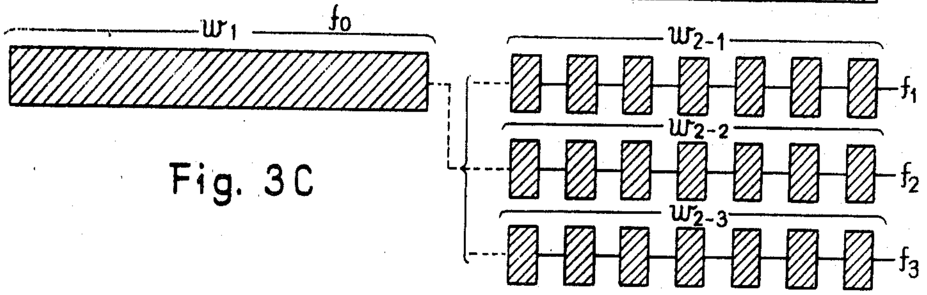

With reference to FIG. 3A, another example of a control signal to be received in accordance with this invention is a sequence signal formed by a common start signal $w_1$ of keyed wave having a frequency $f_o$ and a particular control signal $w_{2\text{-}1}$, $w_{2\text{-}2}$ or $w_{2\text{-}3}$ having frequency $f_1$, $f_2$ or $f_3$ different from one another. The common start signal $w_1$ may be a continuous signal as shown in FIG. 3B. The particular control signals $w_{2\text{-}1}$, $w_{2\text{-}2}$ and $w_{2\text{-}3}$ may be keyed as shown in FIG. 3C.

Figure 4:
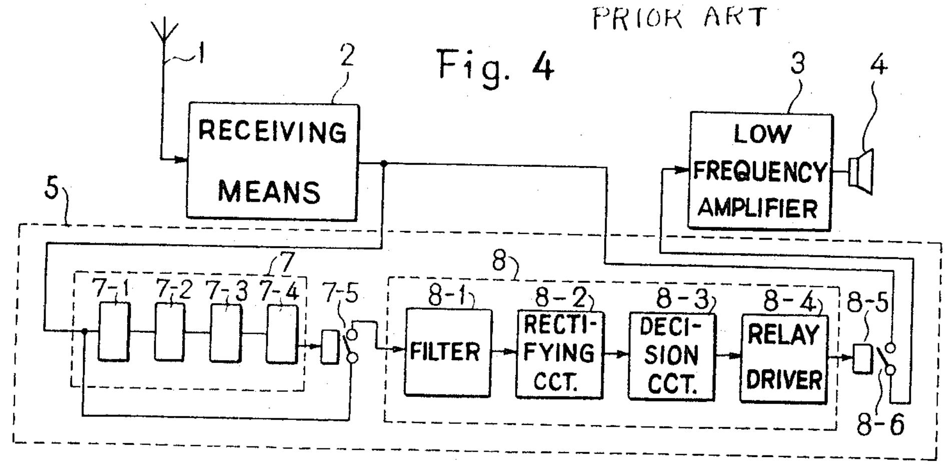

With reference to FIG. 4, a conventional system for receiving a control signal described with reference to FIGS. 3A, 3B and 3C comprises similar circuits except the particular signal detector 8 in comparison with circuits shown in FIG. 2. In this example, a filter 8-1 is provided for selecting a signal of a frequency $f_1$, $f_2$ or $f_3$, and the output of the filter 8-1 is rectified by a rectifying circuit 8-2. As readily understood from the construction, a correct particular signal $w_1$, $w_2$, or $w_3$ transmitted after the start signal $w_1$ is detected by the particular signal detector 8. Details are omitted.

Figure 5:
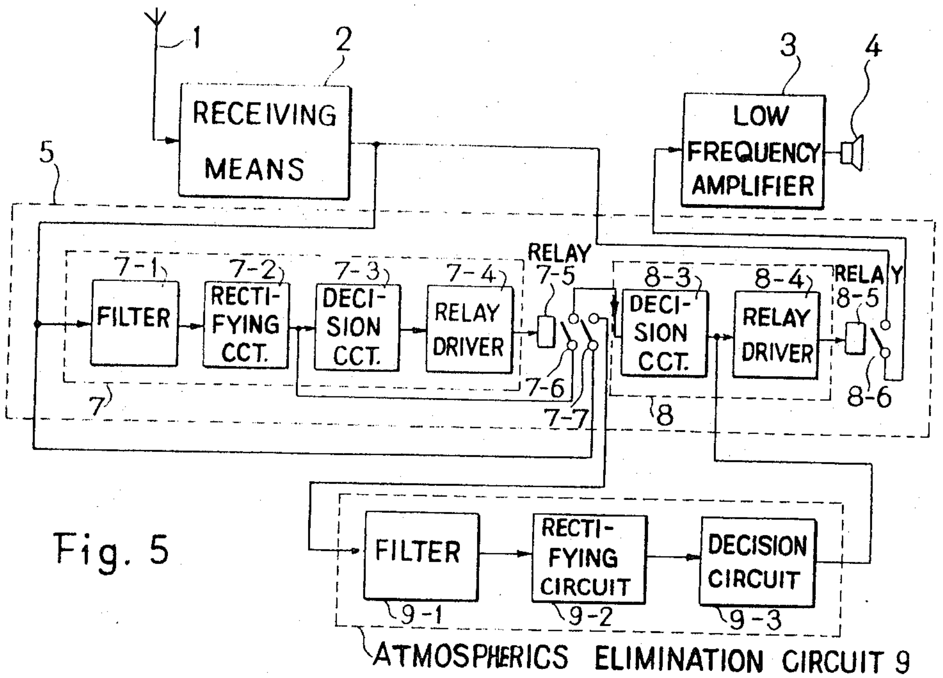
FIGS. 5 and 7 are block diagrams each illustrating an embodiment of this invention.

With reference to FIG. 5, an embodiment of this invention for receiving a control signal described with reference to FIGS. 1A, 1B and 1C further comprises an atmospherics elimination circuit 9 in addition to the system described with reference to FIG. 2. The atmospherics elimination circuit 9 comprises a high-pass filter 9-1 for selecting frequency compoents higher than the frequency $f_o$ of the start signal $w_1$, a rectifying circuit 9-2 connected to the output of the filter 9-1 for rectifying the output of the filter 9-1, and a decision circuit 9-3 having a time constant circuit for generating a decision output if an average value of the output of the rectifying circuit 9-2 exceeds a threshold level. The output of the receiving means 2 is applied to the filter 9-1 through a contact 7-7 of the relay 7-5. The output of the decision circuit 9-3 is applied to the relay driver 8-4.

In operation, if a particular signal extremely affected by strong static noise is received by this receiving system after receiving of the start signal, the decision circuit 8-3 cannot detect the particular control signal due to the strong static noise. On the other hand, the atomspherics elimination circuit 9 detects the strong static noise. Accordingly, the contact 8-6 of the relay 8-5 is closed in response to the decision output of the decision circuit 9-3.

The time constant of the decision circuit 9-3 is determined so as to have a suitable allowance for the fail-safe function. In other words, since a static noise having a relatively long duration extremely increases the automatic gain control voltage of the receiving means 3 so as to cause desensitization of the receiving means 2 while a static noise having a relatively short duration does not affect the gain of the receiving means 2, the time constant of the decision circuit 9 is so determined that the decision output is generated before desensitization occurs in the receiving means 2. The high-pass filter 9-1 is provided for eliminating the frequency component of the particular signal. If the frequency of the particular control signal is determined so as to be lower than a frequency (i.e.; approximately 1,200 Hz) at which a normal voice signal has many frequency components, it is desirable that the cut-off frequency of the high-pass filter 9-1 is higher than about 1,600 Hz.

Figure 6:
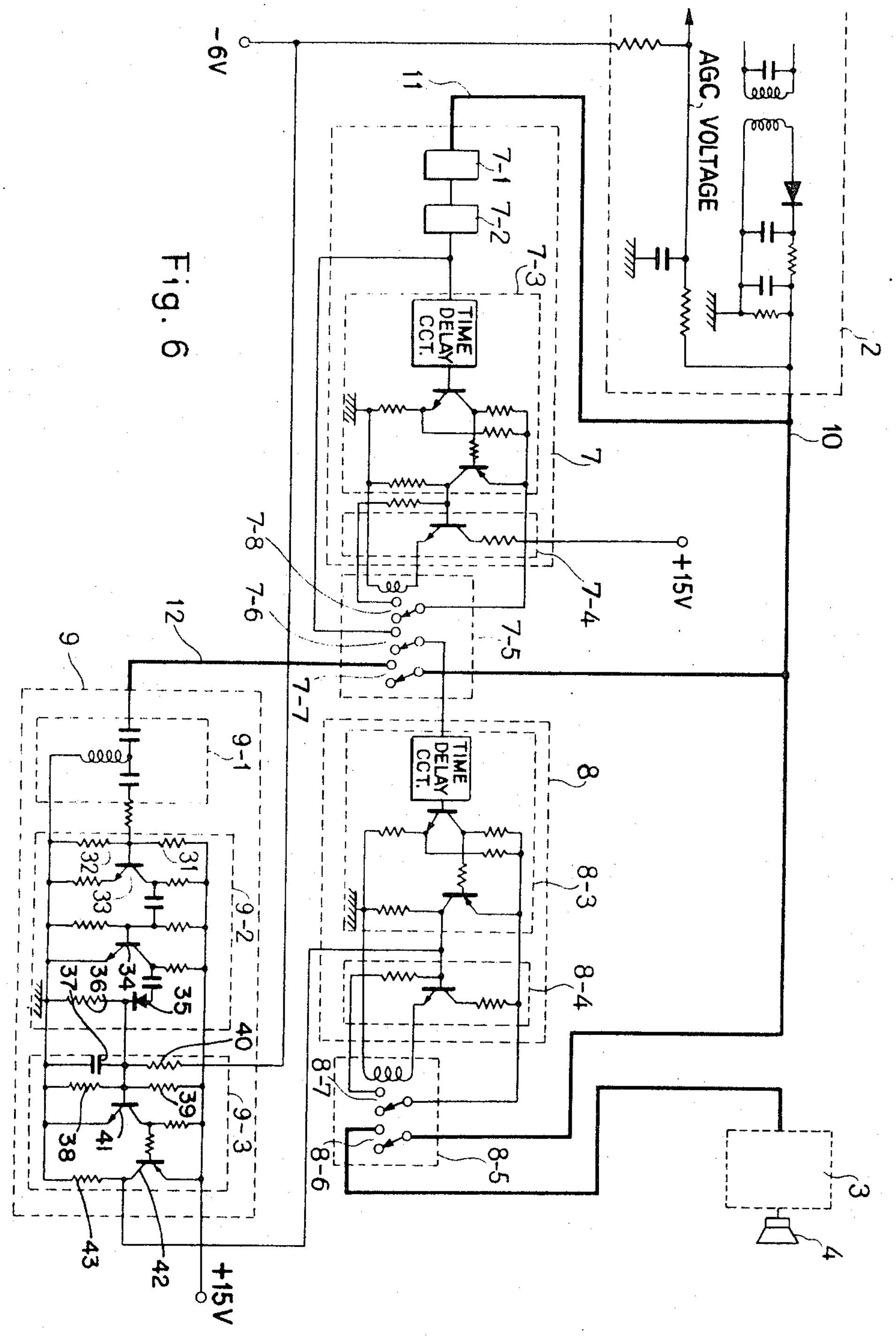
FIG. 6 is a connection diagram explanatory of an example of an atmospherics elimination circuit used in the system of this invention.

In FIG. 6, respective examples of a part of the receiving means 2, the start signal detector 7, the particular signal detector 8 and the atompsherics elimination circuit 9 are illustrated. A contact 7-8 of the relay 7-5 is employed for self-holding the relay 7-5. A contact 8-7 of the relay 8-5 is employed for self-holding the relay 8-5. It will be explained here about how the atmospherics elimination circuit 9 can detect the strong static noise and close the contact 8-6 of the relay 8-5 for compensating the particular control signal's failure of closing the same contact 8-6 due to omission of signals caused by receiver desensitization through that strong noise. If a particular control signal extremely affected by a strong static noise is received by this receiving system after receiving a common start signal, the decision circuit 8-3 cannot effectively detect this particular control signal and fails to actuate the relay 8-5. On the other hand, the static noise enters the atompsherics elimination circuit 9. The higher frequency component of this noise can pass through the high pass filter 9-1 and is amplified by transistors 33 and 34. The output of the transistor 34 is rectified by the rectifier 35 and is smoothed out by a smoothing circuit comprising a resistor 36, a capacitor 37 and a resistor 38. The combined function of resistors 38, 39 and 40 together with the supplied dc voltages (e.g., + 15V and –6V in FIG. 6) supplies a predetermined fixed bias voltage to the terminals of the base and the emitter of the transistor 41. This bias voltage acts as a reference threshold level for the rectified static noise. Only the rectified noise of which level exceeds the reference threshold level can pass through the transistors 41 and 42 and finally actuates the relay 8-5.

Figure 7:
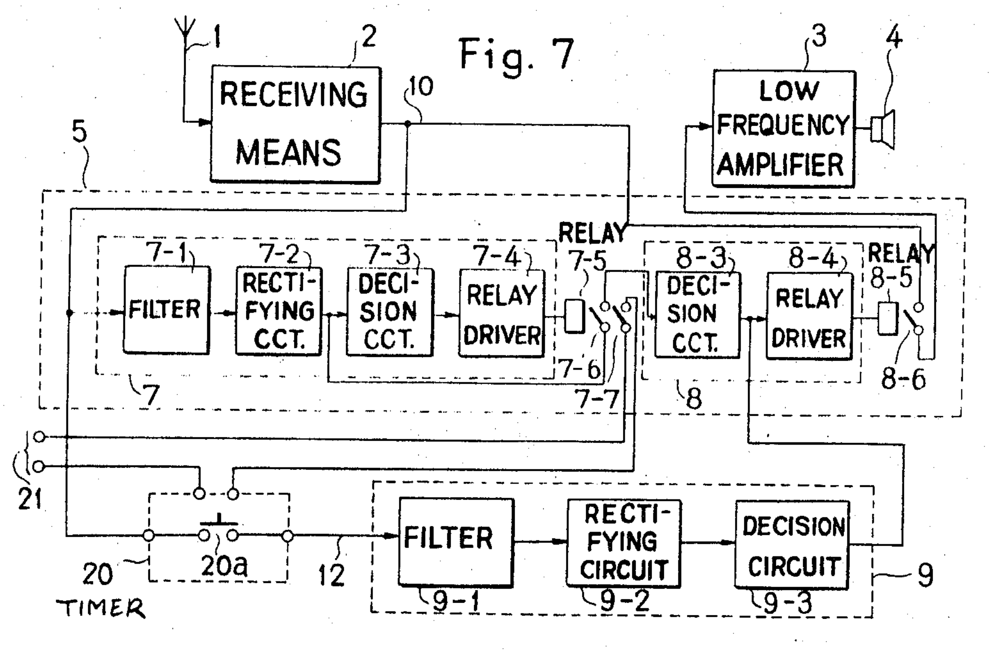

With reference to FIG. 7, a timer 20 may be inserted at the input of the atmospherics elimination circuit 9 to limit operation of the atmospherics elimination circuit during the duration of the particular signal. A contact 20*a* of the timer 20 is closed during the duration of the particular signal after the timer 20 is started in response to the close of the contact 7-7 of the relay 7-5 so as to be excited by a dc source or an ac source connected to terminals 21.

Figure 8:
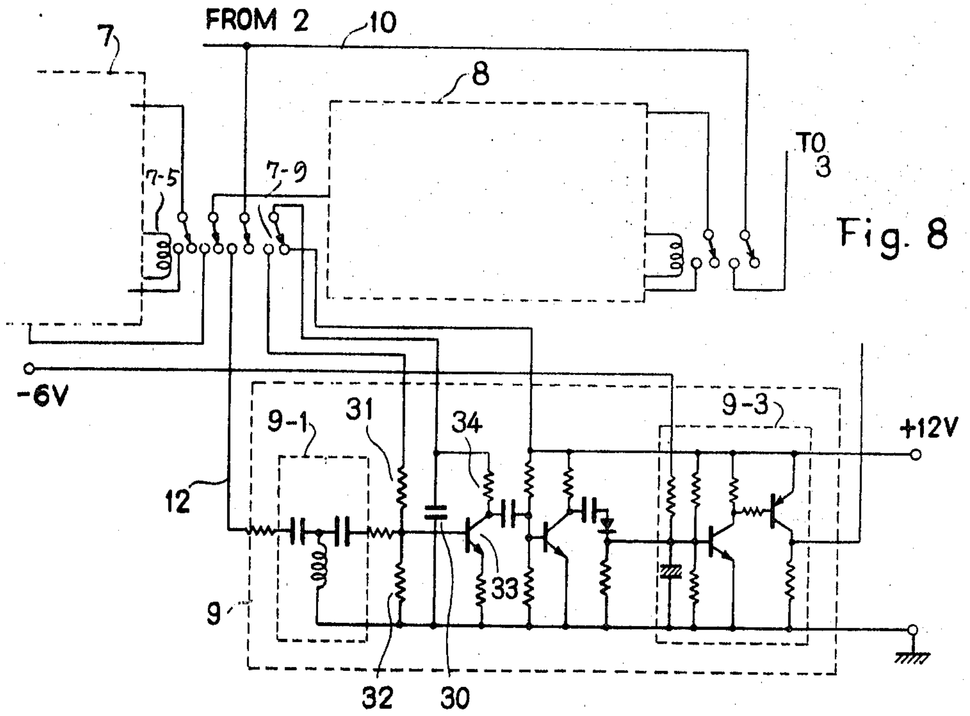
FIG. 8 is a connection diagram explanatory of another example of the atmospherics elimination circuit used in the system of this invention.

With reference to FIG. 8, another example of the atmospherics elimination circuit having a timer function will be described. In this example, the relay 7-5 has a fourth contact 7-9 which switches a terminal of a collector resistor 34 of a transistor 33 to a plus terminal of a source or a terminal of a base bleeder resistor 31. A capacitor 30 is provided so as to be connected across the ground and the terminal of the collector resistor 34. Before the start signal is not received so that the relay 7-5 is not energized, the capacitor 30 is charged by the source voltage. In this case, the transistor 33 is operational but the particular signal is not at all applied to an input terminal 12 of the atompsherics elimination circuit 9 since the relay 7-5 is not energized. If the relay 7-5 is energized in response to the start signal, the capacitor 30 is discharged by the bleeder resistors 31 and 32. Accordingly, the transistor 33 is operational within a constant time only after which the voltage of the capacitor 30 is impossible to make the transistor 33 conductive. The above mentioned constant time is determined by values of the capacitor 30 and the resistors 31 and 32. In this case, since the operational time of the atmospherics elimination circuit 9 is substantially limited to the duration of the particular signal, the cut-off frequency of the high-pass filter 9-1 may be determined near the frequency $f_o$ of the start signal.

The above mentioned atmospheric elimination circuit 9 may be associated with the example described with reference to FIG. 4. In this case, the output of the atmospherics elimination circuit 9 is also connected to the input of the relay driver 8-4.

In accordance with features of this invention mentioned above, the duration of the particular control signal can be determined at a short time in disregard of affection by atmospherics, and the pass-band of a filter for selecting the particular control signal is not necessary to be extremely narrow. Accordingly, the price of the filter is low, and drop of reliability in receiving the particular signal due to fluctuation of the frequency of the particular signal or deviation of the center frequency of the filter can be avoided.

What I claim is:

1. A system for receiving one of particular control signals immediately preceding by a common start signal under protection against static noise, comprising:

receiving means for receiving from a transmission medium an input signal formed by the common start signal and said one of particular control signal;

a first gate operatively coupled to the receiving means;

first decision means connected to the receiving means and the first gate for gating the first gate in response to the common start signal:

control switch means connected to a control object for controlling the controlled object;

second decision means connected to the first gate and the control switch means for switching the control switch means in response to one of particular control signals which is passed through the opened first gate;

third decision means connected to the first gate and the control switch means so as to be in parallel with the second decision means for switching the control switch means in response to static noise caused at the same time as said one of particular control signal.

2. A system according to claim 1, in which the third decision means comprises a high-pass filter for selecting static noise components from the input signal, a rectifying circuit connected to the high-pass filter for rectifying the output of the high-pass filter, and a decision circuit connected to the rectifying circuit for generating a decision output to gate the control switch when the rectified output of the rectifying circuit exceeds a reference level.

3. A system according to claim 1, further comprises a timer for limiting an operational time of the third decision means during a constant time substantially equal to the duration of the particular signal.

4. A system according to claim 3, in which the timer is provided at the input of the third decision means.

5. A system according to claim 3, in which the timer is a time constant circuit provided in the third decision means.

* * * * *